US000001307H

United States Statutory Invention Registration [19]

[11] Reg. Number: H1307

Krohn

[43] Published: May 3, 1994

[54] METHOD FOR CONTINUITY LOGGING

[75] Inventor: Christine E. Krohn, Houston, Tex.

[73] Assignee: Exxon Production Research Company, Houston, Tex.

[21] Appl. No.: 806,078

[22] Filed: Dec. 11, 1991

[51] Int. Cl.[5] ..... G01V 1/40
[52] U.S. Cl. ..... 367/57; 181/101
[58] Field of Search ..... 367/57, 49; 181/101, 181/102, 106

[56] References Cited

U.S. PATENT DOCUMENTS

| | | | |
|---|---|---|---|
| 2,276,335 | 3/1942 | Peterson | 367/57 |
| 4,040,003 | 8/1977 | Beynet et al. | 181/106 |
| 4,144,949 | 3/1979 | Silverman | 181/106 |
| 4,214,226 | 7/1980 | Narasimhan et al. | 181/102 |
| 4,252,209 | 2/1981 | Silverman | 181/106 |
| 4,298,967 | 11/1981 | Hawkins | 367/57 |
| 4,363,112 | 12/1982 | Widrow | 181/106 |
| 4,365,322 | 12/1982 | Widrow | 367/49 |
| 4,524,435 | 6/1985 | Helbig et al. | 367/41 |
| 4,566,084 | 1/1986 | Laine | 367/49 |
| 4,718,048 | 1/1988 | Staron et al. | 367/40 |
| 4,783,771 | 11/1988 | Paulson | 367/57 |
| 4,873,771 | 11/1988 | Paulsson | 367/57 |
| 4,878,206 | 10/1989 | Grosso et al. | 367/83 |
| 4,926,391 | 5/1990 | Rector et al. | 367/41 |
| 4,964,087 | 10/1990 | Widrow | 367/45 |
| 5,005,159 | 4/1991 | Krohn | 367/57 |
| 5,144,590 | 9/1992 | Chon | 367/57 |

OTHER PUBLICATIONS

"Pattern Recognition and Tomography Using Crosswell Acoustic Data," Albright et al., SPE/DOE 13854, Joint Low Permeability Reservoirs Syup., Denver, May 15, 1985.

*Primary Examiner*—Ian J. Lobo

[57] ABSTRACT

A drill bit drilling a borehole is used as a strong high frequency, subsurface seismic source in combination with at least one receiver in a preexisting borehole to determine the continuity of a subsurface formation layer extending between the borehole being drilled by the drill bit and the borehole in which the receiver is located. The receiver(s) in the preexisting borehole may be any conventional seismic receiver or receivers, such as hydrophones or geophones. The receiver or receivers are positioned in the preexisting borehole at a depth adjacent the formation layer whose continuity is to be determined. The depth (position), velocity and thickness of the layer is determined from a conventional well log of the preexisting borehole. A frequency power spectrum for a preselected frequency range (the range is selected based on the logging data) may be computed from the signals recorded by the receiver(s). Several such spectra may be computed from signals recorded for several different time intervals and then summed to increase the signal-to-noise ratio. A large amplitude in this power spectrum (or the detected signals) is indicative of a low velocity layer that is continuous between the drill bit source and the borehole containing the receivers.

17 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR CONTINUITY LOGGING

BACKGROUND OF THE INVENTION

This invention relates to determining formation continuity and, more particularly, relates to determining the continuity of a subsurface formation or layer penetrated by an existing borehole while drilling a second borehole adjacent the existing borehole, through that same subsurface formation.

Determining the continuity of a subsurface geologic layer penetrated by two adjacent boreholes is important to the oil and gas industry. In exploration, for example, such subsurface layer continuity information may be used to (1) construct a geologic model of the subsurface area containing the layer; (2) correlate observed formation properties between adjacent boreholes; and (3) determine if there are faults present in the layer. In production, for example, such continuity information may be used to (1) indicate the continuity of a reservoir layer between adjacent boreholes, and (2) indicate the presence of permeability barriers in such a reservoir layer.

U.S. Pat. No. 5,005,159 issued on Apr. 2, 1991 by Christine E. Krohn entitled "Continuity Logging Using Differenced Signal Detection" discloses a method for determining the continuity of a subsurface lithographic layer which is penetrated by two adjacent boreholes; this patent is incorporated herein by reference. This patent employs a seismic source lowered into a first borehole to a depth corresponding to the depth of the layer, or adjacent the layer, whose continuity is to be determined, while a receiver pair is simultaneously lowered into a second borehole to a depth corresponding to the depth of the layer, or adjacent that same layer. The recording of high amplitude signals at depths corresponding to the layer, i.e., within a layer, is an indication of a continuous low velocity layer extending through the subsurface between the two boreholes.

The problem with most downhole sources is that they are weak compared to surface sources. This is because the source must be relatively weak as compared to conventional surface seismic sources in order to avoid damage to the borehole wall. In addition, the operation of a downhole seismic source is expensive in a producing well (one producing hydrocarbon fluids) because the well must be shut in (cease producing fluids) during the use of the source.

A drill bit may be used as a downhole seismic source, as suggested in U.S. Pat. No. 4,718,048. The method described in this patent involves the convolution of signals recorded by conventional surface seismic detectors with a reference signal recorded on the drill string. The result is a seismogram as a function of time that is similar to that recorded by a conventional impulsive seismic source. This seismogram is similar to walk-away VSP and may be used to locate subsurface layers having appropriate reflection coefficients located adjacent the borehole. The seismogram is limited to frequencies of less than about 100 Hz because the reference signal does not include high frequency vibrations of the drill bit. Because of this frequency limitation this method is not capable of detecting thin (less than about 50 feet or so) reflective layers in the earth adjacent the borehole. Furthermore, this method cannot be used if there is excessive noise present in the frequency band of interest from the drilling rig.

These and other limitations and disadvantages of the prior art are overcome by the present invention, however, and an improved method is provided for determining the continuity of a subsurface geologic layer or formation that is penetrated by a preexisting borehole.

SUMMARY OF THE INVENTION

In the preferred embodiment of the present invention, a drill bit drilling a borehole is used as a strong high frequency, subsurface seismic source and is used in combination with at least one receiver in a preexisting borehole to determine the continuity of a subsurface formation layer believed to extend between the borehole being drilled by the drill bit and the borehole in which the receiver(s) is (are) located. The receiver(s) in the preexisting borehole may be any conventional seismic receiver or receivers, such as hydrophones or geophones, but preferably are the geophone pair noted in the incorporated patent to Krohn. The receiver or receivers are positioned in the preexisting borehole at a depth corresponding to a layer, i.e., adjacent the formation layer whose continuity is to be determined. The depth (or position), velocity, and thickness of the layer may be determined from a conventional well log of the preexisting borehole. A frequency power spectrum for a preselected frequency range (with the range selected based on the well log data) is computed from the signals recorded by the receivere(s). Several such spectra may be computed from signals recorded for several different time intervals and then summed to increase the signal-to-noise ratio. Large amplitudes in recorded signals or in computed frequency power spectra for this layer are indicative of a low velocity layer that is continuous between the drill bit source and the borehole containing the receivers.

It is a feature of the present invention to provide a new, inexpensive and easily operated method for determining the continuity of preselected subsurface formations.

These and other features and advantages of the present invention will become apparent from the following detailed description, wherein reference is made to the figures in the accompanying drawings.

IN THE DRAWINGS

DETAILED DESCRIPTION

Figure 1:
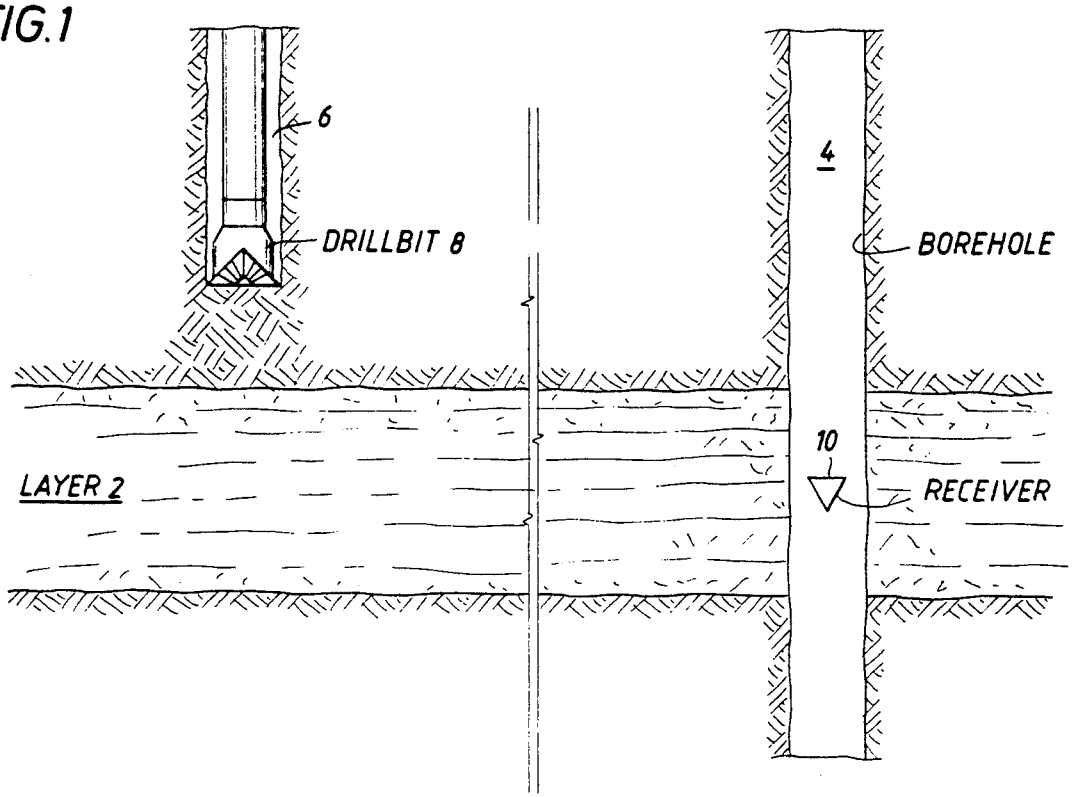
FIG. 1 depicts a simplified vertical section (partially in cross-section) of a portion of the earth illustrating a low velocity layer penetrated by a preexisting borehole and a drill bit drilling a second borehole.

Referring now to FIG. 1, there may be seen a simplified vertical section (partially in cross-section) of a portion of the earth illustrating a low velocity layer 2 penetrated by a preexisting borehole 4. In addition, it may be seen that there is a second borehole 6 being drilled by a conventional drill bit 8. There may also be seen a seismic receiver 10 which has been lowered into the preexisting well bore 4 and is located adjacent the low velocity layer 2, i.e., at the depth of the layer. This receiver 10 may be any type of conventional seismic receiver, but preferably the receiver 10 is a differencing geophone pair, as taught by the incorporated U.S. patent to Krohn.

Prior to any determination of continuity of a preselected layer, the preexisting well 4 must be logged with conventional well logging tools to identify any low velocity layers 2 which intercept the preexisting well 4. The average velocity (v) and thickness (d) for each layer 2 or interval of interest may also be determined from the data resulting from such a well logging process.

The receiver or detector 10 is lowered into the preexisting borehole 4 until it is positioned at approximately the depth of a preselected low velocity layer 2; this layer has an approximate thickness d. As depicted in FIG. 1, when the receiver is so positioned, the low velocity layer 2 is well below the depth (by at least 50 to 100 feet) to which the drill bit 8 drilling the second borehole 6 has penetrated. Signals from the receiver 10 are recorded for a preselected period of time (usually a few minutes is sufficient), and a power spectrum for a preselected frequency range may then be computed from these recorded signals according to known methods. These receiver signals may be recorded for several different time intervals, and the resulting calculated power spectra summed in order to increase the signal-to-noise ratio.

Figure 2:
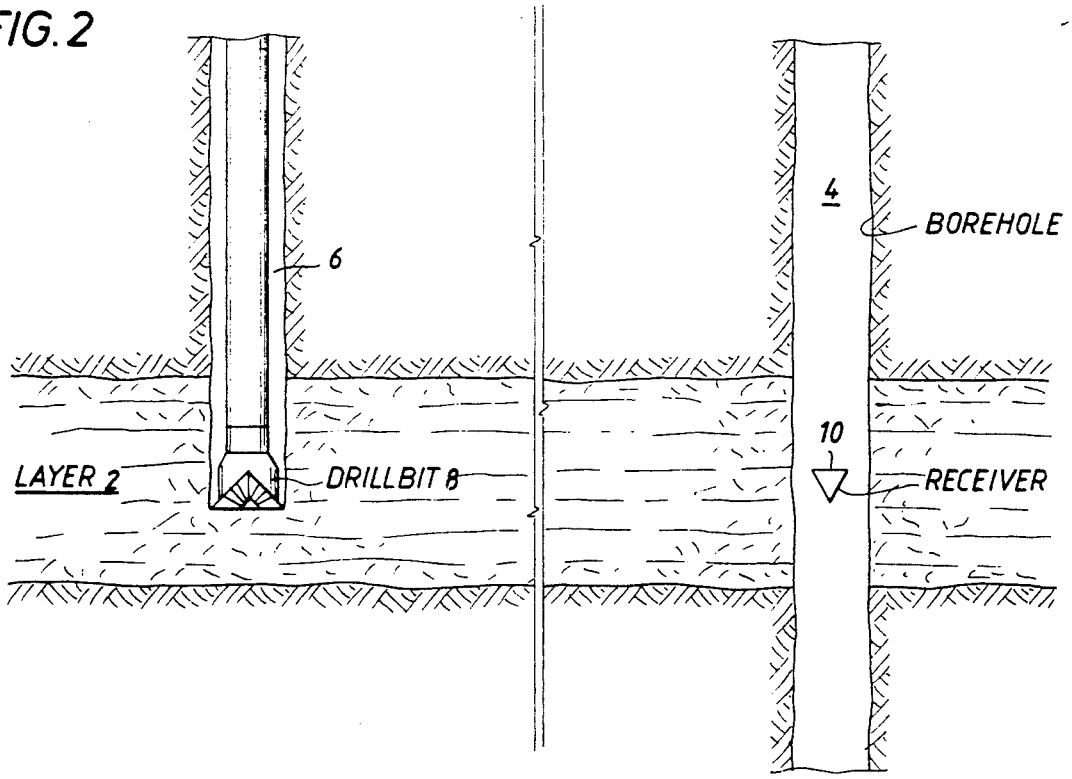
FIG. 2 depicts the same vertical section of the earth of FIG. 1, with the drill bit now penetrating the low velocity layer.

At one or more subsequent times, such recording and processing is repeated again, especially when the drill bit 8 is believed to be at the depth of the layer of interest 2. Substantially higher amplitudes of the recorded signals, or increases in the amplitudes of the power spectra, in the preselected frequency range compared to the previous results ( well away from the layer's position 2) indicate a continuous low velocity layer between the drill bit 8 and the receiver 10 as depicted in FIG. 2. The preselected frequency range for which the higher amplitudes should occur is calculated from the average velocity (v) for the interval of interest 2 divided by half the thickness (d) of the layer 2 and the velocity (v) divided by 10d. That is, the frequency range of interest is between about 2v/d and about v/10d. The receiver 10 may then be lowered to the next deeper preselected low velocity layer, and the process may then be repeated for each of these preselected deeper layers in sequence by depth.

Continuity of a low velocity layer is determined by the identification of guided wave energy propagated from the drill bit 8 in one borehole 6 to a receiver 10 ( or receivers) in the second borehole 4, via such a layer 2. Acoustic energy or seismic waves may be trapped within a low-velocity layer which then effectively behaves as a wave guide. Acoustic energy or seismic waves are trapped or partially trapped in such a low-velocity layer by critical reflections of acoustical energy at the boundaries of the layer. These trapped waves or energy are commonly referred to as guided waves, seam waves, or channel waves. Such guided waves have normal amplitudes within such a layer, whereas the amplitudes in the material immediately surrounding the low velocity layer rapidly approach zero with increasing distance from the layer. Thus, guided waves have their largest amplitudes in the low velocity layer, but because of this, they are sensitive to any discontinuities in that layer.

The useful frequency range for guided waves is determined by the acoustic energy's wavelength and the thickness of the layer. As the wavelength of the acoustic wave becomes large compared to the layer's thickness, more of the wave energy travels in the surrounding material and less in the low velocity layer. When this happens, a guided wave cannot be used to accurately determine the continuity of a layer. Generally, the wavelength used for guided waves should be less than about ten times the thickness of the layer. As the wavelength becomes smaller (below about one tenth the thickness) compared to the thickness of a layer, the amplitude of the guided wave decreases. Thus, preferably, the wavelength may be greater than about half the thickness of the layer. Since frequency (f) is equal to the velocity (v) divided by the wavelength ($\lambda$), these limitations correspond to a frequency range of about v/10d to about 2v/d.

It is presently believed that the methods of the present invention may be used to test the continuity of layers as thin as about two feet. However, once the thickness of the layers (whose continuity are desired to be determined) is known from a well log, one (or more) frequency bands appropriate for those thicknesses may be selected. Similarly, once this frequency band is known, then a suitable frequency range for a band pass filter may also be determined for particular layer thickness. In this manner it is possible to filter out the low frequency borehole reverberation noises to increase the sensitivity of the detectors in a borehole. The thinner the layer thickness, the higher the frequency that should be employed in order to measure the continuity of the layer.

As is known in the art, roller cone bits are better than other types of bits for producing acoustic energy or seismic waves. It is presently believed that these bits should also be excellent sources for guided waves. Roller cone bits are known to apply both vertical impact and transverse shearing forces. It is presently believed that so-called "vertical" sources are better sources for guided waves than are explosive or radial sources. In addition, transverse motion of the drill bit will generate a preferred type of guided wave with particle motion parallel to the layer; this motion is preferable to other types of guided waves because it is totally trapped in the low velocity layer and because it is less affected by interference from other wave types. However, it is difficult to generate these types of guided waves with conventional downhole sources.

Figure 3:
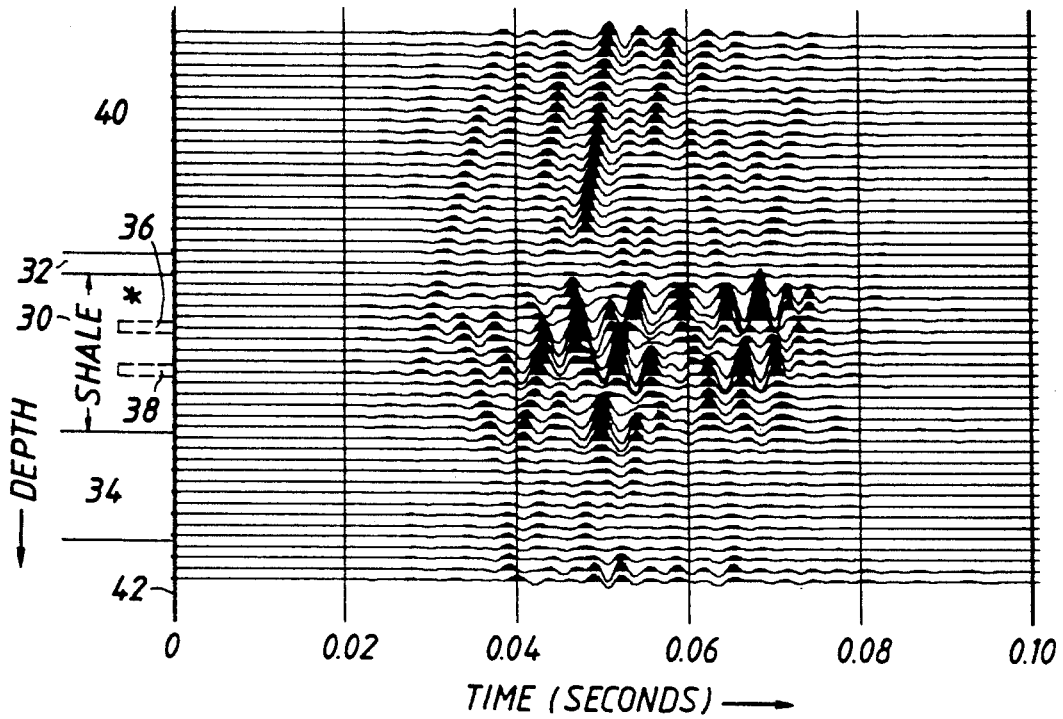
FIG. 3 depicts computer generated data for a low velocity shale layer between two wells using a conventional downhole radial, explosive source and the dual receiver of the Krohn patent.
Figure 4:
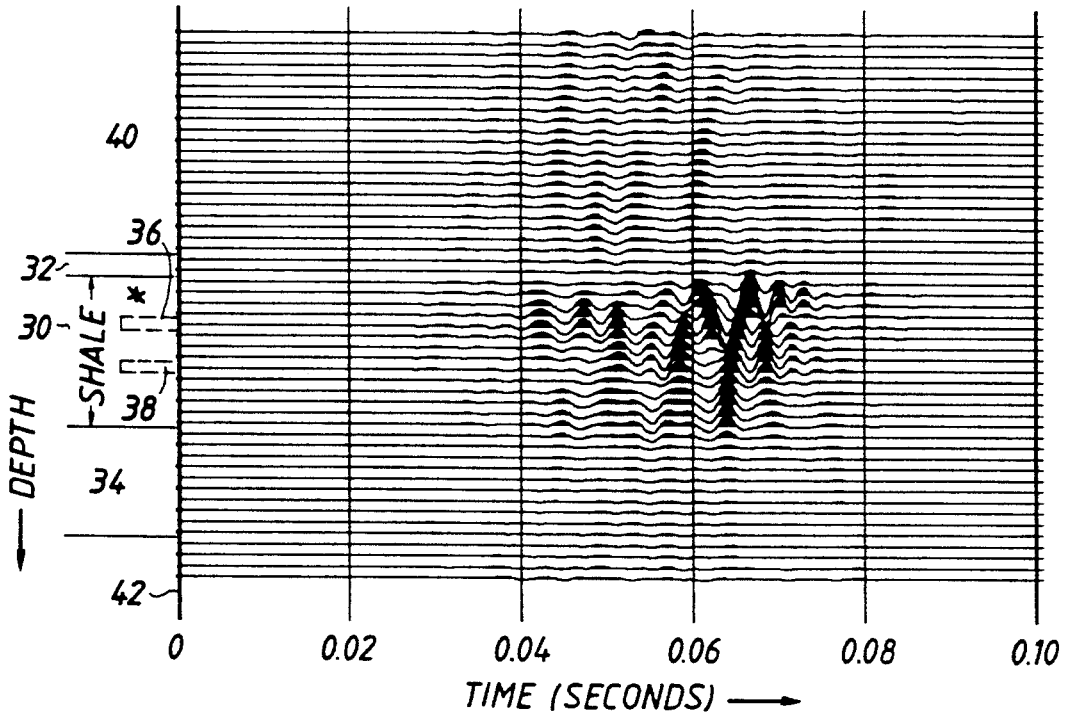
FIG. 4 depicts computer generated data for the low velocity shale layer between the two wells of FIG. 3 using a conventional downhole vertical source and the dual receiver of the Krohn patent.

FIGS. 3 and 4 depict computer generated data for two adjacent wells that illustrate superior results may be obtained with a vertical impact source as compared to radial or explosive sources. The two wells are modelled as 300 feet apart. FIG. 3 corresponds to data from a radial, explosive source, and FIG. 4 corresponds to data from a vertical source. The data of FIGS. 3 and 4 were generated by repeatedly "shooting" a source located in one well at the depth (indicated by the asterik) of a low velocity shale layer 30, which is bounded above and below by a high velocity limestone 32, 34, respectively. In addition, the shale layer 30 contains two "stringers" (thin layers) of limestone 36, 38, as indicated by the dotted lines. There is a sandstone layer 40 on top of the limestone "cap" 32 and another shale layer 42 below the lower limestone layer 34. Each trace in FIGS. 3 and 4 corresponds to data from a dual receiver pair (as described in the patent to Krohn) located in the second well. The data was generated as follows: the receiver is modelled first as positioned at a depth above the low velocity layer 30 in the second well, the source is fired, and the response of the receiver is generated, then the receiver is modelled as lowered two feet deeper in the receiver well and the process repeated, until well below the low velocity shale layer 30.

The large amplitudes in the computer generated data correspond to guided waves traveling in the shale. Comparing FIGS. 3 and 4, it may be seen that the amplitudes of FIG. 4 are larger in the low velocity layer, compared to data from above and below the low velocity layer, than the corresponding amplitudes in and outside of the layer shown in FIG. 3. This simulation demonstrates that guided waves from a "vertical" source are more easily detected in a continuous low velocity layer spanning two adjacent boreholes. Accordingly, a "vertical" source is presently preferred to detect continuity of a low velocity layer between an existing borehole and a borehole being drilled through that layer.

Use of a drill bit as a downhole acoustic or seismic source has a number of additional advantages over conventional downhole sources. All downhole sources have the potential of damaging the borehole, and since some care must be taken to minimize borehole damage, the source must necessarily be weak. Thus, there are difficulties in reliably producing acoustic energy or seismic waves from a small borehole deep within the earth. In addition, these borehole sources are expensive to operate. Additional expense is incurred in a producing well because the well must be shut in and production tubing removed from the well before a source can be placed in the well. These problems are avoided by recording formation continuity data, using the drill bit as a source, while a well is being drilled adjacent a preexisting well.

It is also well known in the art that guided waves may convert to tube waves in a fluid in a borehole. Accordingly, it is believed possible to have the detectors at locations other than adjacent the formation layer whose continuity is to be determined, so long as there is drilling fluid or some other fluid in the borehole to propagate any converted guided wave up to the borehole (or down the borehole) as a tube wave to the location of the detectors.

The methods of the present invention in general comprise comparison of recorded signals when the drill bit source is both in and out of (preferably above) the layer; that is, recorded signals from different time intervals corresponding to different drill bit depths, i.e., preferably depths above and in the layer. Alternatively, depths in the layer and below the layer may be employed. More particularly, this involves recording signals when the receivers are preferably at depths adjacent the formation layers whose continuity is to be determined and when the drill bit is clearly well above (or below) this formation layer. In addition, it involves recording signals when the drill bit is believed to be in the formation whose continuity is to be determined, and a comparison of that signal with the signals recorded when the drill bit was above the formation layer of interest. If there is a sufficient increase (typically about a factor of two or greater is sufficient) in the magnitude of the recorded signal or, alternatively, its frequency power spectra in the frequency band of interest, then the layer is continuous between the drill bit and the receiving well.

Although preferably a power spectra of the resulting signals is used to determine when the drill bit source is within the layer and that layer is continuous, it is also within the scope of the present invention to assess the continuity of a layer when the drill bit is within that layer by means of detection of large amplitudes in the recorded signals. That is, large amplitudes in the recorded signals may be used as the criteria for determining when there is continuity in a layer between the drill bit (as a source) and the receivers (positioned in or adjacent the layer whose continuity is to be determined). Appropriate electronic circuits may be constructed to perform the function of a band pass filter and allow the amplitude in the desired (preselected) frequency range or spectra to pass through relatively unattenuated. This amplitude may then be converted into a voltage signal representative of the continuity of the layer whose signals are being passed through the band pass filter.

However, as noted before, this requires some information regarding the formation layers through which the receiving borehole penetrates. More particularly, a conventional log has been run of the receiving borehole to determine what formation layers are present, what their depths are, what their velocities are and what their thicknesses are. This log may be the log run after completion of drilling of the borehole, and need not be a log run just before drilling of the second well begins. This allows the preselection of appropriate low velocity layers of interest, and then the preselection of the frequency band(s) of interest for such layers, as described earlier herein. It is also possible to use existing geological models of the area penetrated by the preexisting and drilled boreholes in planning the continuity logging survey. For example, the seismic data that has been used in the area to determine where to drill the first (receiving) borehole may also be employed to determine any possible layer tilts or sloping formations which would accordingly change the depth at which the drill bit would be expected to penetrate the layer of interest. The continuity logging survey may then be used to confirm the existing geological model of the reservoir.

The methods of the present invention are particularly useful for determination of appropriate places for infield drilling and/or resolution of production reservoir anomalies. Further, the detector well may be a cased or lined well. That is, the casing or lining of the existing well need not be removed to practice the present invention. For the methods of the present invention, the detector or hydrophone may be used in a cased or lined well. More particularly, the casing or lining need not be removed before use as a receiver well. The geophone receivers associated with the methods of the present invention may be clamped to the casing to couple the geophone to the formation and thereby receive seismic vibrations propagated through the formation layers of interest. In this manner the methods of the present invention are preferable to others which require not only the stopping of production from a cased or lined well, but additionally the removal of any production tubing string.

Many other variations and modifications may be made in the apparatus and techniques hereinbefore described, by those having experience in this technology, without departing from the concepts of the present invention. Accordingly, it should be clearly understood that the apparatus and methods depicted in the accompanying drawings and referred to in the foregoing description are illustrative only and are not intended as limitations on the scope of the invention.

What is claimed is:

1. A method for determining the continuity of a preselected subsurface formation penetrated by a first borehole, comprising:

locating at least one detector at a depth adjacent said preselected subsurface formation in said first borehole, drilling a second borehole in the earth adjacent said first borehole, detecting with said at least one detector acoustic energy generated by said drilling of said second borehole, and determining the continuity of said preselected formation between said first and second boreholes from said detected acoustic energy.

2. A method as described in claim 1, further comprising:

computing power spectra for a preselected frequency range from said detected acoustic energy, and wherein said determining step employs said computed power spectra to detect amplitude increases in said preselected subsurface formation representative of continuity between said first and second borehole.

3. A method as described in claim 1, wherein said preselected subsurface formation is a low velocity layer.

4. A method as described in claim 3, wherein said low velocity layer is a porous or poorly consolidated formation.

5. A method as described in claim 1, further comprising:

logging said first borehole and recording logging data.

6. A method as described in claim 5, further comprising:

determining said preselected subsurface formation from said logging data.

7. A method as described in claim 6, further comprising:

determining the thickness of said preselected formation layer from said logging data.

8. A method as described in claim 7, further comprising:

determining the average seismic velocity of said preselected formation layer from said logging data.

9. A method as described in claim 8, further comprising:

determining a preselected frequency range from said thickness and logging data.

10. A method as described in claim 9, further comprising:

filtering said detected acoustic energy to exclude frequencies outside said preselected frequency range.

11. A method as described in claim 9, wherein said detecting step is for said preselected frequency range.

12. A method as described in claim 11, wherein said preselected frequency range is between a frequency determined by dividing said average seismic velocity by half the thickness of said formation layer and a frequency determined by dividing said average seismic velocity by one-tenth the thickness of said formation layer.

13. A method as described in claim 6, further comprising:

determining a preselected frequency for said formation from said logging data.

14. A method as described in claim 1, wherein said detecting step comprises:

detecting acoustic energy at a time when the depth of said second borehole is different than the depth of said preselected subsurface formation, and detecting acoustic energy at a different time when the depth of said second borehole is approximately the depth of said preselected formation.

15. A method as described in claim 14, wherein said determining step comprises:

comparing the detected acoustic energy from said times to determine amplitude increases at said different time relative to said other time.

16. Apparatus for determining the continuity of a preselected subsurface formation penetrated by a first borehole, comprising:

means for detecting acoustic energy generated by a means for drilling a second borehole moveably locatable in said first borehole, and means for determining the continuity of said preselected formation between said first and second borehole from said detected acoustic energy.

17. The apparatus of claim 16, further comprising:

a band pass filter having a preselected frequency bandwidth for filtering acoustic energy from said means for detecting.

* * * * *